Sept. 7, 1965  J. B. McCORMICK ETAL  3,204,424
MICROTOME SPECIMEN-FREEZING APPARATUS
Filed Oct. 23, 1962  2 Sheets-Sheet 1
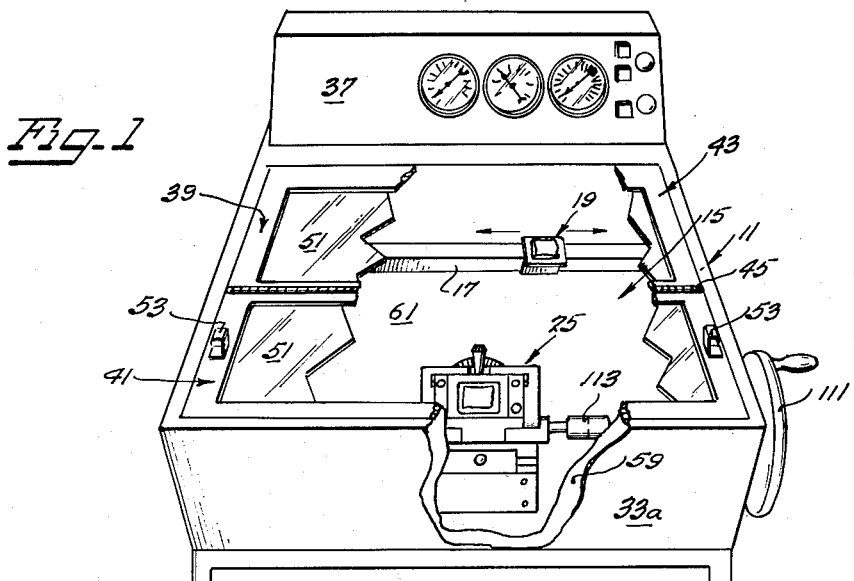
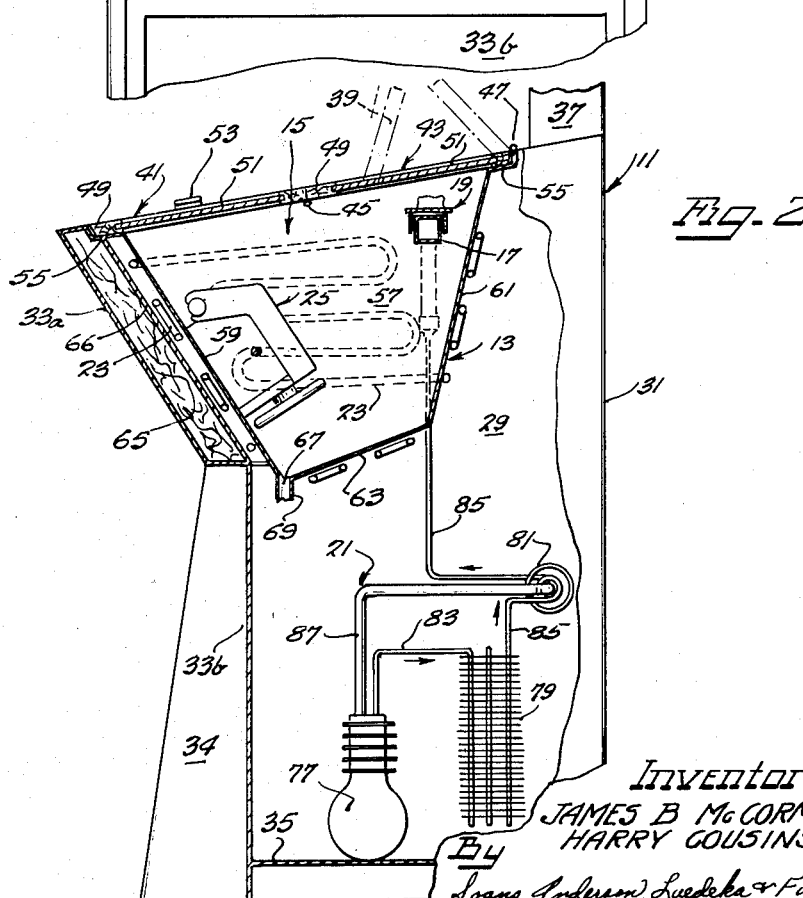
Inventor
JAMES B McCORMICK
HARRY COUSINS
By Soans, Anderson, Luedeka & Fitch
Attys Sept. 7, 1965 J. B. McCORMICK ETAL 3,204,424
MICROTOME SPECIMEN-FREEZING APPARATUS
Filed Oct. 23, 1962 2 Sheets-Sheet 2
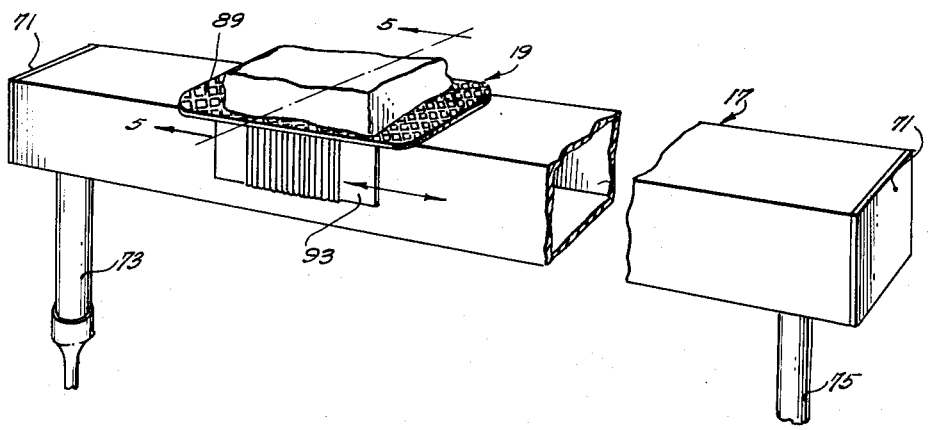
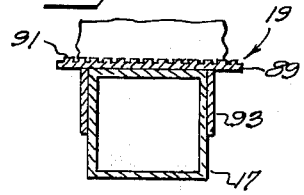
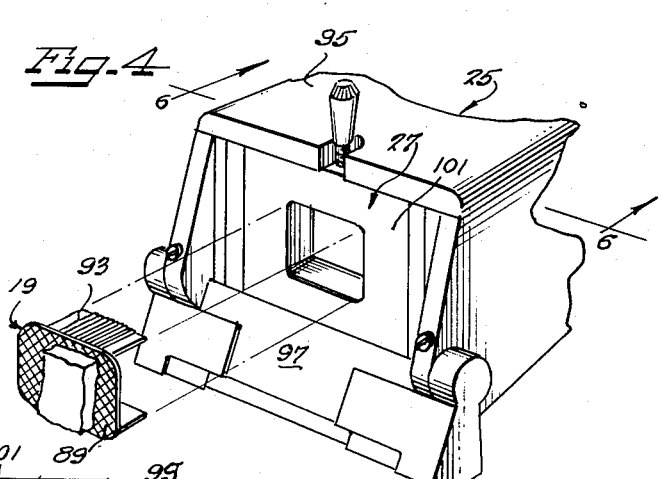
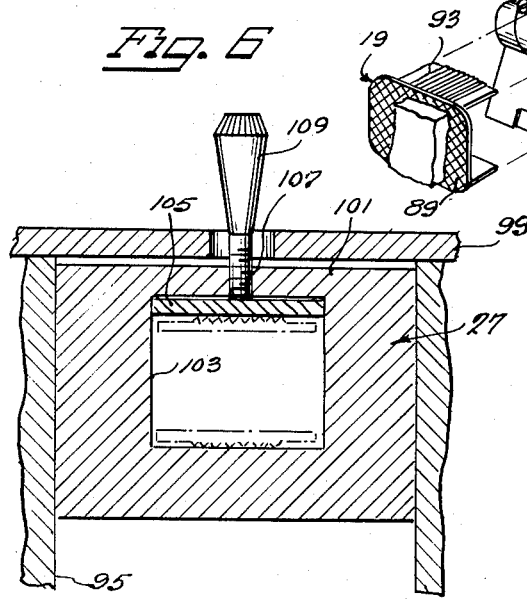
Inventors
JAMES B McCORMICK
HARRY COUSINS 3,204,424
Patented Sept. 7, 1965

3,204,424
MICROTOME SPECIMEN-FREEZING APPARATUS
James B. McCormick, La Grange, and Harry Cousins, Lemont, Ill., assignors, by direct and mesne assignments, to Ames Atomium, Inc., Billerica, Mass., a corporation of Massachusetts
Filed Oct. 23, 1962, Ser. No. 232,475
3 Claims. (Cl. 62—320)

This invention relates to apparatus utilized in the preparation of thin sections for microscopic examination, and has for its principal object the provision of an improved apparatus for providing frozen sections of tissue and the like.

An additional object of the invention is the provision of an improved apparatus for the quick-freezing of specimens preparatory to the removal of sections therefrom.

Another object of the invention is the provision of an improved carrier to which a specimen can readily be frozen, and which is adapted to be conveniently clamped within the movable chuck of a microtome.

A further object of the invention is the provision of an improved apparatus which is adapted to quick-freeze and section a specimen.

A still further object of the invention is the provision of an apparatus which is adapted to quick-freeze a specimen, and to remove one or more sections from the specimen in a refrigerated atmosphere so as to maintain the sections at a temperature below their melting point.

Other objects and advantages of the invention will become apparent with reference to the following description and the accompanying drawings.

In the drawings:

FIGURE 1 is a partially broken-away fragmentary perspective view of an apparatus showing various of the features of the invention;

FIGURE 2 is a partially broken-away fragmentary elevational view, partially in section, of the apparatus of FIG. 1;

FIGURES 3 and 4 are enlarged fragmentary perspective views of certain portions of the apparatus shown in FIGS. 1 and 2;

FIGURE 5 is a sectional elevational view taken along line 5—5 of FIG. 3; and

FIGURE 6 is an enlarged sectional elevational view taken along line 6—6 of FIG. 4.

Very generally, the apparatus shown in the illustrated embodiment of the invention comprises a cabinet 11 having walls 13 which define an interior chamber or well 15. A tubular freeze bar 17 extends generally horizontally across the chamber 15 and is adapted to receive a specimen carrier or saddle 19 for sliding movement on its outer surface. Means 21 are provided within the cabinet for passing a refrigerant through the bar 17 so as to maintain the bar at a temperature below the freezing point of the specimen, thereby withdrawing heat from the saddle and specimen and freezing the specimen to the saddle. The means 21 is also effective to pass the refrigerant through refrigeration coils 23 disposed adjacent the walls 13 of the chamber so as to chill the walls and atmosphere within the chamber and thereby provide a cool environment within which a sectioning of the specimen may be accomplished. A microtome 25 supported within the chamber 15 is provided with a reciprocally movable chuck 27 to which the specimen carrier 19 is clamped for the sectioning operation.

More specifically, the cabinet 11 encloses the refrigerated chamber 15 in which the sectioning operation is performed and also houses the refrigeration equipment by means of which the chamber and the freeze bar are cooled. The cabinet 11 is of a generally hollow design and includes a pair of spaced-apart general parallel side walls 29, a generally vertical rear wall 31, and a forward wall 33. While the forward wall 33 may of course be a single piece which extends the entire height of the cabinet, it is, in the illustrated embodiment, comprised of an upper portion 33a which slopes rearwardly and downwardly from the upper forward edge of the cabinet, and a lower portion 33b which is generally vertical and is inset from the forward edges of the side walls. A panel 34 is preferably secured to the forwardly projecting portion of each of the side walls to form a leg at each side of the lower portion of the front wall 33b.

The lower end of the cabinet is preferably provided with a base panel 35 on which the various components of the refrigeration means 21 may be mounted. The upper end of the cabinet slopes downwardly and forwardly and is provided with an instrument panel 37 which extends transversely of the cabinet between the side walls 29 adjacent the upper edge of the rear wall 31, and houses various switches, timers, temperature measuring instruments and the like utilized in the operation of the apparatus. The upper end of the cabinet is open forwardly of the instrument panel 37 to permit access to the chamber or well 15, as will soon become apparent.

The open upper portion of the cabinet forwardly of the instrument panel 37 is provided with a closure 39 comprising a forward and a rearward panel 41 and 43 respectively interconnected by a common hinge 45, the axis of which extends normal to the side walls 29 of the cabinet. A second hinge 47 further connects the rearward edge of the rear panel 43 to the upper edge of the cabinet 11 along an axis disposed forwardly of the instrument panel 37. Each of the forward and rearward panels of the closure 39 includes a frame 49 of metal or the like and a transparent plate 51 which permits visual access to the chamber 15, soon to be described. Handles 53 are provided on the forward panel 41 to permit the closure 39 to be easily raised to a stable position, as shown in FIG. 2 of the drawings, when it is desired to gain access to the chamber. The upper edges of the cabinet are provided with suitable ledges 55 to receive the closure in the closed position.

The refrigerated chamber 15, which is in the form of a recessed well, extends inwardly of the cabinet from the upper edges of the side, rear and front walls thereof, and is defined by an inner wall structure which includes a pair of inwardly sloping side walls 57, and downwardly sloping converging front and rear walls 59 and 61 respectively connected at their lower ends by a downwardly and forwardly sloping bottom wall 63. All of the walls of the chamber 15 are spaced from their adjacent cabinet walls to provide room for the refrigeration coils 23 and suitable insulation 65. A spacer sheet 66 may be interposed between the coils and insulation if desired. An opening 67 is provided in the lowermost edge of the bottom wall 63 and is connected to a suitable discharger pipe 69 to permit drainage of the chamber, as when it is defrosted or cleaned.

As previously mentioned, the function of the freeze bar 17 is to provide a very cold surface upon which the specimen carrier 19 can be supported and which will withdraw heat from a specimen so as to freeze it to the carrier. The freeze bar of the illustrated embodiment (FIG. 3) comprises a preferably metallic tubular rod of rectangular cross-section which extends between openings (not shown) provided in the side walls 57 of the chamber adjacent the upper edges thereof and in elevated relation to the bottom wall 63 of the chamber. The ends of the rod are capped, as at 71, but an inlet pipe 73 and an outlet pipe 75 are connected to the lower wall of the bar or rod adjacent its opposite ends to permit entry and exit of the refrigerant. Preferably, the refrigerant enters the freeze bar immediately after it has passed through the expansion phase of the refrigeration cycle and prior to entering the refrigeration coils 23 located adjacent the walls of the chamber. In this manner, the surface of the freeze bar is maintained at the lowest possible temperature and is capable of quickly withdrawing the heat from the specimen.

If desired, a separate pipe (not shown) may be disposed within the tubular rod to provide a conduit for the refrigerant, the space between the bar and pipe being then filled with a material (not shown) having a high specific heat and capable of remaining at a low temperature for a relatively long period of time after the flow of the refrigerant has stopped. In this manner, the freeze bar will remain cold for some time after the refrigeration means 21 has been shut off.

The refrigeration system 21 which circulates the refrigerant through the freeze bar 17 and coils 23 includes generally a compressor 77, a condenser 79, and a heat exchanger 81, these components, together with the freeze bar and several sets of coils all being disposed within the cabinet 11 and combining to form a closed circuit for the refrigerant.

More specifically, the compressor 77 is supported on the base plate 35 and is connected by a conduit 83 to the condenser 79, similarly supported. A capillary tube 85 extends, in coiled form, from the condenser 79 through the heat exchanger 81 and directly to the inlet pipe 73 of the freeze bar 17, which inlet pipe is of a greater diameter than the capillary tube 85 and permits a rapid expansion of the refrigerant. The greatest amount of heat absorption by the refrigerant, therefore, takes place within the freeze bar. The outlet pipe 75 of the freeze bar is connected to the first of the series of coils 23, which coils are interconnected so as to permit the refrigerant to flow through them consecutively. The last of the coils is connected by a conduit (not shown) to the heat exchanger 81, which is in turn connected by the conduit 87 to the compresser.

A refrigerated chamber is thus provided within which a specimen can be frozen for sectioning, and within which the sectioning of the specimen can be performed, as will become apparent shortly. In a refrigerated atmosphere, the specimen remains frozen for a longer period of time, and the section which is trimmed from the specimen also remains frozen and does not melt. Also, refrigeration of the chamber 15 chills the microtome 25 supported within the chamber, thus making it impossible for either the specimen or section to contact a warm surface during the sectioning operation.

Referring now to FIGS. 3 through 6, the carrier or saddle 19 which supports the specimen includes a flat plate 89 of generally rectangular configuration but rounded corners, and having a roughened upper surface 91 to which the specimen will readily adhere when frozen. The plate is adapted to rest upon the upper surface of the bar 17 and is wider than the bar so as to overhang it somewhat at each side (FIG. 5). The plate is somewhat longer than the anticipated size of the specimen to present a large surface area through which heat can be dissipated to the freeze bar.

A pair of parallel side walls 93, provided with a series of parallel ridges on their outer surface, extend downwardly from the lower surface of the plate 89 and are spaced a distance from one another slightly greater than the diameter of the freeze bar 17. Accordingly, when the saddle 19 is placed upon the freeze bar with the plate 89 resting on the upper surface of the bar, the inner surface of each of the side walls 93 of the saddle engage the side walls of the bar and further increase the area of contact through which the heat may be dissipated. The disposition of the side walls is also of particular advantage in the clamping of the saddle within the movable chuck 27 of the microtome 25, as will soon become apparent.

The relative dimensions of the saddle and freeze bar, in addition to enhancing the conductive transfer of heat therebetween, also serve a second important function. During periods when the instrument is not in use, condensation may tend to collect on the freeze bar and form a frost which, if not removed, would act as an insulator between the saddle and bar. The intimate engagement between the saddle and bar, however, permits the removal of the frost merely by sliding the saddle back and forth across the bar. Both of these features are enhanced by the use of a bar of rectangular cross section and a saddle which includes a flat plate and depending parallel side walls.

In the freezing of the specimen to the saddle, the specimen is placed on the upper surface of the flat plate and the saddle is in turn placed on the freeze bar, as shown in FIG. 3, with the lower surface of the top plate in contact with the upper surface of the bar, and with the inner surfaces of each of the side walls of the saddle in contact with the side walls of the bar. Heat is thus drawn from the specimen through the plate, and the surface of the specimen which is in contact with the plate is the first to become frozen, adjacent portions of the specimen being subsequently frozen. The freezing of the specimen in this manner is more uniform and results in less distortion of the specimen than is the case where the specimen is frozen by spraying with liquid carbon dioxide.

The saddle 19 is intended to be placed within the chuck of a microtome for the sectioning operation after the specimen has been frozen to it. Accordingly, the microtome 25 is mounted on the front wall 59 of the chamber 15 and includes a housing which supports a knife blade 97 and the chuck 27 mounted within the housing for reciprocating movement adjacent the knife blade. The chuck 27 comprises generally a rectangular frame 101 suitably connected to the operating mechanism of the microtome (not shown) and provided with a central opening 103 having a vertical dimension somewhat greater than the distance between the outer surface of the side walls 93 of the saddle and having a horizontal dimension slightly greater than the length of one of the side walls. An insert plate 105 is provided which rests upon the upper surface of the uppermost side wall of the saddle (FIG. 6) and, when inserted, leaves a very slight clearance between the walls defining the opening and the walls of the saddle and insert.

In order that the saddle may be clamped within the opening, a threaded hole 107 is provided in the upper portion of the frame 101 in communication with the rectangular opening 103 into which the saddle side walls are inserted and, more specifically, is in communication with the upper surface of the insert plate 105. The threaded hole 107 receives a bolt 109 which, when threaded into the opening and tightened, engages the upper surface of the insert plate 105 and causes it to bear against the upper surface of the uppermost of the side walls 93 of the saddle 19 so as to secure the saddle in place.

It will be noted that the disposition of the side walls is particularly adapted to this clamping action and, when so clamped, each of the side walls is engaged along its entire outer surface, the clamping force being evenly distributed so as to prevent wobbling or shifting of the saddle.

If desired, the microtome may be operated remotely by means of a handle 111 journalled in a side wall 29 of the cabinet and connected to the microtome by means of a shaft 113. In this manner, the sectioning may be accomplished with the closure 39 closed so as to maintain the chamber 15 in a refrigerated condition.

An apparatus has thus been provided which is adapted to both freeze and section a specimen for microscopic examination. The apparatus of the illustrated embodiment is contained in a single unit so as to render the operation highly efficient and capable of rapid performance.

While various of the features of the invention have been shown and described with respect to one embodiment thereof, it should be apparent that various modifications may be made without departing from the scope of the invention.

What is claimed is:

1. Apparatus for freezing a specimen in preparation for the removal of sections therefrom by means of a microtome, said apparatus comprising an elongated tubular bar having a generally flat horizontally disposed top wall and a pair of generally vertically disposed side walls, said bar being supported so as to afford access to its top and side walls, means for passing a refrigerant through said bar so as to chill the outer surface thereof to a temperature below that at which the specimen freezes, a specimen carrier adapted to support the specimen and to be slidably carried on said bar, said specimen carrier including a flat specimen-receiving plate adapted to rest upon the flat upper surface of said top wall of said bar and a pair of opposed generally parallel wall members depending from the lower surface of said plate in generally parallel relation to the said side walls of said bar, the opposing inner wall surfaces of said depending wall members of said specimen carrier being spaced from one another a distance slightly greater than the distance between the outer surfaces of the side walls of said bar so as to afford engagement between said opposing surfaces of said wall members of said carrier and said side walls of said bar, said engagement being effective to withdraw heat from said carrier and specimen so as to freeze said specimen to said carrier, said wall members of said carrier being secured to said plate in such a manner as to enable them to withstand clamping engagement within the chuck of a microtome.

2. Apparatus for providing frozen sections for microscopic examination, which apparatus comprises an elongated tubular bar having a generally flat horizontally disposed top wall and a pair of generally vertically disposed side walls, said bar being supported so as to provide access to said top and side walls, means for passing a refrigerant through said bar so as to chill the outer surface thereof to a temperature below that at which the specimen freezes, a specimen carrier adapted to support the specimen and to be slidably carried on said bar, said specimen carrier including a flat specimen-receiving plate adapted to rest upon the flat upper surface of said top wall of said bar and a pair of parallel wall members depending from the lower surface of said plate and normal thereto, the opposing inner wall surfaces of said depending wall members of said specimen carrier being spaced from one another a distance slightly greater than the distance between the outer surfaces of the side walls of said bar so as to afford engagement between said opposing surfaces of said wall members of said carrier and said side walls of said bar, said engagement being effective to withdraw heat from said carrier and specimen so as to freeze said specimen to said carrier, and a microtome for supporting said carrier during the sectioning operation, said microtome including a reciprocally movable member having an opening therein for receiving said depending wall members of said specimen carrier, and means on said reciprocally movable member for engaging said wall members so as to fasten said carrier to said reciprocally movable member.

3. Apparatus for providing sections of frozen specimen comprising a cabinet, walls within said cabinet defining a chamber, an elongated tubular bar supported at its ends within said chamber, said bar having a generally flat horizontally disposed top wall and a pair of generally vertically disposed side walls, said bar being arranged within said chamber so as to afford access to its top and side walls, refrigeration coils disposed adjacent said chamber-defining walls, means for passing a refrigerant through said tubular bar and coils so as to chill said bar to a temperature below that at which said specimen freezes and refrigerate said chamber, a specimen carrier adapted to support a specimen and to be slidably carried on said tubular bar, said specimen carrier including a flat specimen-receiving plate adapted to rest upon the flat upper surface of said top wall of said bar and a pair of opposed generally parallel wall members depending from the lower surface of said plate in generally parallel relation to the said side walls of said bar, the opposing inner wall surfaces of said depending wall members of said specimen carrier being spaced from one another a distance slightly greater than the distance between the outer surfaces of the side walls of said bar so as to afford engagement between said opposing surfaces of said wall members of said carrier and said side walls of said bar, said engagement being effective to withdraw heat from said carrier and specimen so as to freeze said specimen to said carrier, and a microtome including a reciprocally movable member adapted to receive and hold said specimen carrier in a predetermined position during the sectioning of the specimen, said reciprocally movable member having an opening therein for receiving said depending wall members of said specimen carrier, and means on said reciprocally movable member for engaging said wall members so as to fasten said carrier to said reciprocally movable member.

References Cited by the Examiner

UNITED STATES PATENTS

| Re. 17,586 | 2/30 | Platten | 62—458 |
| 2,212,953 | 8/40 | Popp et al. | 83—915.5 X |
| 2,447,699 | 8/48 | Hardin | 62—458 X |

FOREIGN PATENTS

| 210,986 | 7/09 | Germany. |

ROBERT A. O'LEARY, *Primary Examiner.*